(12) United States Patent
Morton

(10) Patent No.: US 9,688,517 B2
(45) Date of Patent: *Jun. 27, 2017

(54) SCANNER SYSTEMS

(71) Applicant: Rapiscan Systems, Inc., Torrance, CA (US)

(72) Inventor: Edward James Morton, Guildford (GB)

(73) Assignee: Rapiscan Systems, Inc., Torrance, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 14/460,130

(22) Filed: Aug. 14, 2014

(65) Prior Publication Data

US 2015/0036798 A1 Feb. 5, 2015

Related U.S. Application Data

(63) Continuation of application No. 12/993,834, filed as application No. PCT/GB2009/001250 on May 20, 2009, now Pat. No. 8,840,303.

(30) Foreign Application Priority Data

May 20, 2008 (GB) .................................. 0809109.2

(51) Int. Cl.
*H05G 1/02* (2006.01)
*B66C 13/16* (2006.01)
(Continued)

(52) U.S. Cl.
CPC .............. *B66C 13/16* (2013.01); *B66C 13/18* (2013.01); *B66C 19/00* (2013.01); *G01V 5/0066* (2013.01); *G01V 5/0083* (2013.01)

(58) Field of Classification Search
CPC .... G01V 5/0008; G01V 5/0016; G01N 23/00; G01N 23/02; G01N 23/04; G01N 23/06;
(Continued)

(56) References Cited

U.S. PATENT DOCUMENTS

| 2,831,123 A | 4/1958 | Daly |
| 3,766,387 A | 10/1973 | Heffan |

(Continued)

FOREIGN PATENT DOCUMENTS

| EP | 0077018 A1 | 4/1983 |
| EP | 0176314 | 4/1986 |

(Continued)

OTHER PUBLICATIONS

International Search Report for PCT/GB2009/000497, Jan. 22, 2010.

(Continued)

*Primary Examiner* — Jurie Yun
(74) *Attorney, Agent, or Firm* — Novel IP

(57) ABSTRACT

A crane including support means arranged to support a load and to move the load along a path, and a scanner including a radiation source and radiation detection means arranged to scan a scanning volume. The path is arranged to pass through the scanning volume so that the scanner can scan the load as it moves along the path.

20 Claims, 3 Drawing Sheets

(51) Int. Cl.
*G01V 5/00* (2006.01)
*B66C 13/18* (2006.01)
*B66C 19/00* (2006.01)

(58) Field of Classification Search
CPC ........ G01N 23/08; G01N 23/083; A61B 6/44; A61B 6/4405; A61B 6/4429; A61B 6/4435; A61B 6/447; B66C 7/00; B66C 7/06; B66C 17/00; B66C 17/04; B66C 17/20; B66C 2700/00; B66C 2700/012; B66C 2700/03; B66C 23/90; B66C 13/46
USPC ................... 378/57, 62, 195; 212/312, 276
See application file for complete search history.

(56) References Cited

U.S. PATENT DOCUMENTS

| | | |
|---|---|---|
| 3,770,955 A | 11/1973 | Tomita |
| 3,784,837 A | 1/1974 | Holmstrom |
| 3,904,923 A | 9/1975 | Schwartz |
| 4,047,035 A | 9/1977 | Dennhoven |
| 4,139,771 A | 2/1979 | Dennhoven |
| 4,210,811 A | 7/1980 | Dennhoven |
| 4,216,499 A | 8/1980 | Dennhoven |
| 4,366,382 A | 12/1982 | Kotowski |
| 4,430,568 A | 2/1984 | Yoshida |
| 4,566,113 A | 1/1986 | Doenges |
| 4,599,740 A | 7/1986 | Cable |
| 4,626,688 A | 12/1986 | Barnes |
| 4,641,330 A | 2/1987 | Herwig |
| 4,709,382 A | 11/1987 | Sones |
| 4,736,401 A | 4/1988 | Donges |
| 4,788,704 A | 11/1988 | Donges |
| 4,809,857 A * | 3/1989 | Steuck ............... G01P 3/486 212/276 |
| 4,817,123 A | 3/1989 | Sones |
| 4,825,454 A | 4/1989 | Annis |
| 4,872,188 A | 10/1989 | Lauro |
| 4,884,289 A | 11/1989 | Glockmann |
| 4,979,202 A | 12/1990 | Siczek |
| 4,991,189 A | 2/1991 | Boomgaarden |
| 5,022,062 A | 6/1991 | Annis |
| 5,065,418 A | 11/1991 | Bermbach |
| 5,091,924 A | 2/1992 | Bermbach |
| 5,098,640 A | 3/1992 | Gozani |
| 5,179,581 A | 1/1993 | Annis |
| 5,181,234 A | 1/1993 | Smith |
| 5,182,764 A | 1/1993 | Peschmann |
| 5,221,843 A | 6/1993 | Alvarez |
| 5,224,144 A | 6/1993 | Annis |
| 5,237,598 A | 8/1993 | Albert |
| 5,247,561 A | 9/1993 | Kotowski |
| 5,253,283 A | 10/1993 | Annis |
| 5,313,511 A | 5/1994 | Annis |
| 5,367,552 A | 11/1994 | Peschmann |
| 5,379,334 A | 1/1995 | Zimmer |
| 5,493,596 A | 2/1996 | Annis |
| 5,548,123 A | 8/1996 | Perez-Mendez |
| 5,638,420 A | 6/1997 | Armistead |
| 5,642,393 A | 6/1997 | Krug |
| 5,642,394 A | 6/1997 | Rothschild |
| 5,666,393 A | 9/1997 | Annis |
| 5,687,210 A | 11/1997 | Maitrejean |
| 5,692,028 A | 11/1997 | Geus |
| 5,751,837 A | 5/1998 | Watanabe |
| 5,764,683 A | 6/1998 | Swift |
| 5,768,334 A | 6/1998 | Maitrejean |
| 5,787,145 A | 7/1998 | Geus |
| 5,805,660 A | 9/1998 | Perion |
| 5,838,759 A | 11/1998 | Armistead |
| 5,903,623 A | 5/1999 | Swift |
| 5,910,973 A | 6/1999 | Grodzins |
| 5,930,326 A | 7/1999 | Rothschild |
| 5,940,468 A | 8/1999 | Huang |
| 5,974,111 A | 10/1999 | Krug |
| 6,031,890 A | 2/2000 | Bermbach |
| 6,058,158 A | 5/2000 | Eiler |
| 6,067,344 A | 5/2000 | Grodzins |
| 6,081,580 A | 6/2000 | Grodzins |
| 6,094,472 A | 7/2000 | Smith |
| 6,151,381 A | 11/2000 | Grodzins |
| 6,188,747 B1 | 2/2001 | Geus |
| 6,192,101 B1 | 2/2001 | Grodzins |
| 6,192,104 B1 | 2/2001 | Adams |
| 6,195,413 B1 | 2/2001 | Geus |
| 6,198,795 B1 | 3/2001 | Naumann |
| 6,218,943 B1 | 4/2001 | Ellenbogen |
| 6,249,567 B1 | 6/2001 | Rothschild |
| 6,252,929 B1 | 6/2001 | Swift |
| 6,256,369 B1 | 7/2001 | Lai |
| 6,278,115 B1 | 8/2001 | Annis |
| 6,282,260 B1 | 8/2001 | Grodzins |
| 6,292,533 B1 | 9/2001 | Swift |
| 6,301,326 B2 | 10/2001 | Bjorkholm |
| 6,320,933 B1 | 11/2001 | Grodzins |
| 6,347,132 B1 | 2/2002 | Annis |
| 6,356,620 B1 | 3/2002 | Rothschild |
| 6,424,695 B1 | 7/2002 | Grodzins |
| 6,434,219 B1 | 8/2002 | Rothschild |
| 6,435,715 B1 | 8/2002 | Betz |
| 6,442,233 B1 | 8/2002 | Grodzins |
| 6,445,765 B1 | 9/2002 | Frank |
| 6,453,003 B1 | 9/2002 | Springer |
| 6,453,007 B2 | 9/2002 | Adams |
| 6,456,684 B1 | 9/2002 | Mun |
| 6,459,761 B1 | 10/2002 | Grodzins |
| 6,459,764 B1 | 10/2002 | Chalmers |
| 6,473,487 B1 | 10/2002 | Le |
| RE37,899 E | 11/2002 | Grodzins |
| 6,483,894 B2 | 11/2002 | Hartick |
| 6,507,025 B1 | 1/2003 | Verbinski |
| 6,532,276 B1 | 3/2003 | Hartick |
| 6,542,574 B2 | 4/2003 | Grodzins |
| 6,542,578 B2 | 4/2003 | Ries |
| 6,542,580 B1 | 4/2003 | Carver |
| 6,546,072 B1 | 4/2003 | Chalmers |
| 6,552,346 B2 | 4/2003 | Verbinski |
| 6,563,903 B2 | 5/2003 | Kang |
| 6,580,778 B2 | 6/2003 | Meder |
| 6,584,170 B2 | 6/2003 | Aust |
| 6,597,760 B2 | 7/2003 | Beneke |
| 6,606,516 B2 | 8/2003 | Levine |
| 6,636,581 B2 | 10/2003 | Sorenson |
| 6,653,588 B1 | 11/2003 | Gillard-Hickman |
| 6,658,087 B2 | 12/2003 | Chalmers |
| 6,663,280 B2 | 12/2003 | Doenges |
| 6,665,373 B1 | 12/2003 | Kotowski |
| 6,665,433 B2 | 12/2003 | Roder |
| 6,763,635 B1 | 7/2004 | Lowman |
| 6,785,357 B2 | 8/2004 | Bernardi |
| 6,812,426 B1 | 11/2004 | Kotowski |
| 6,816,571 B2 | 11/2004 | Bijjani |
| 6,837,422 B1 | 1/2005 | Meder |
| 6,839,403 B1 | 1/2005 | Kotowski |
| 6,843,599 B2 | 1/2005 | Le |
| 6,920,197 B2 | 7/2005 | Kang |
| 7,039,159 B2 | 5/2006 | Muenchau |
| 7,166,844 B1 | 1/2007 | Gormley |
| 7,207,713 B2 | 4/2007 | Lowman |
| 7,762,760 B2 * | 7/2010 | Takehara ............. B65G 63/004 212/325 |
| 7,783,003 B2 * | 8/2010 | Clayton ................ G01N 23/04 212/270 |
| 2004/0017888 A1 | 1/2004 | Seppi |
| 2004/0086078 A1 | 5/2004 | Adams |
| 2004/0125914 A1 | 7/2004 | Kang |
| 2004/0141584 A1 | 7/2004 | Bernardi |
| 2004/0258198 A1 | 12/2004 | Carver |
| 2005/0117700 A1 | 6/2005 | Peschmann |
| 2005/0135668 A1 | 6/2005 | Polichar |
| 2005/0156734 A1 | 7/2005 | Zerwekh |
| 2005/0157842 A1 | 7/2005 | Agrawal |
| 2005/0169421 A1 | 8/2005 | Muenchau |
| 2006/0027751 A1 | 2/2006 | Kurita |

(56) References Cited

U.S. PATENT DOCUMENTS

| | | |
|---|---|---|
| 2006/0284094 A1 | 12/2006 | Inbar |
| 2007/0110215 A1 | 5/2007 | Hu |
| 2007/0140423 A1 | 6/2007 | Foland |
| 2007/0172129 A1 | 7/2007 | Tortora |
| 2007/0189454 A1 | 8/2007 | Georgeson |
| 2007/0210255 A1 | 9/2007 | Bjorkholm |
| 2007/0269005 A1 | 11/2007 | Chalmers |
| 2007/0280416 A1 | 12/2007 | Bendahan |
| 2007/0280502 A1 | 12/2007 | Paresi |
| 2007/0286337 A1 | 12/2007 | Wang |
| 2008/0044801 A1 | 2/2008 | Modica |
| 2008/0084963 A1 | 4/2008 | Clayton |
| 2008/0304622 A1 | 12/2008 | Morton |

FOREIGN PATENT DOCUMENTS

| | | |
|---|---|---|
| EP | 0287707 | 10/1988 |
| EP | 0919186 A2 | 6/1999 |
| EP | 1413898 A1 | 4/2004 |
| GB | 2255634 A | 11/1992 |
| GB | 2424065 A | 9/2006 |
| GB | 2438317 A | 11/2007 |
| WO | 9855851 A1 | 12/1998 |
| WO | 2004010127 A1 | 1/2004 |
| WO | 2005098400 A2 | 10/2005 |
| WO | 2006036076 A1 | 4/2006 |
| WO | 2006045019 | 4/2006 |
| WO | 2006078691 A2 | 7/2006 |
| WO | 2006095188 | 9/2006 |
| WO | 2007035359 A2 | 3/2007 |
| WO | 2007051092 | 5/2007 |
| WO | 2008017983 A2 | 2/2008 |

OTHER PUBLICATIONS

International Search Report for PCT/GB2009/000556, Feb. 19, 2010, Rapiscan Security Products, Inc.

International Search Report for PCT/GB2009/001250, Mar. 2, 2010, Rapiscan Security Products Inc.

International Search Report for PCT/GB2009/001275, Jul. 24, 2009, Rapiscan Security Products Inc.

International Search Report PCT/GB2009/000515, Feb. 23, 2010, Rapiscan Security Products, Inc.

International Search Report PCT/GB2009/001277, Jul. 20, 2010, Rapiscan Systems, Inc.

International Search Report PCT/GB2009/001444, Apr. 6, 2010, Rapiscan Security Products.

Mobile X-Ray Inspection Systems, Internet Citation, Feb. 12, 2007, pp. 1-2, URL:http://web.archive.org/web/20070212000928/http://www.bombdetecti- on.com/cat--details.php?catid=20.

Molchanov P A et al: 'Nanosecond gated optical sensors for ocean optic applications' Sensors Applications Symposium, 2006. Proceedings of the 2006 IEEE Houston, Texas,USA Feb. 7-9, 2006, Piscataway, NJ, USA,IEEE, Feb. 7, 2006 (Feb. 7, 2006) , pp. 147-150, XP010917671 ISBN: 978-0-7803-9580-0.

Office Action dated Apr. 4, 2013 for U.S. Appl. No. 12/993,834.

* cited by examiner

SCANNER SYSTEMS

CROSS-REFERENCE TO RELATED APPLICATIONS

The present application is a continuation of U.S. patent application Ser. No. 12/993,834, filed on Feb. 22, 2011, which, in turn, is a national stage application of PCT/GB2009/001250, filed on May 20, 2009, which, in turn, relies on Great Britain Patent Application Number 0809109.2, filed on May 20, 2008, for priority. All priority applications are herein incorporated by reference in their entirety.

FIELD OF THE INVENTION

The present invention relates to scanning systems, and has particular application in cargo scanning systems.

BACKGROUND OF THE INVENTION

There exists a requirement for screening of cargo for detection of illicit materials and devices. Today, the X-ray inspection of containers and other cargo items is becoming more routine. However, the costs of container inspection by this means may be prohibitive in some situations due to the requirement to position the cargo load for inspection separately from its positioning for storage or onwards transport.

As an example, cargo is often taken to a separate scanning area and remains stationary while a moving radiation source and detection system pass along the load. Alternatively, the load is placed onto a moving conveyor and is moved through a stationary imaging system. In either case, the cargo is moved to a separate scanning location to be inspected, resulting in increased cost and time for cargo handling.

SUMMARY OF THE INVENTION

The present invention therefore provides a crane comprising support means arranged to support a load and to move the load along a path, and a scanner comprising a radiation source and radiation detection means arranged to scan a scanning volume, wherein the path is arranged to pass through the scanning volume so that the scanner can scan the load as it moves along the path.

The support means may comprise a carrier and suspension means arranged to suspend the load from the carrier. The carrier may be movable in order to move the load along the path.

The detection means may comprise a plurality of detectors mounted on a support structure. The support structure may extend around the scanning volume and define a gap through which a part of the supporting means can pass as the load is moved through the scanning volume, wherein the gap may be in an upper side of the support structure, and a part of the support structure supporting at least one of the detectors may extend upwards adjacent to the gap so as to detect radiation from the source that passes through the gap. The radiation source may be arranged to direct all radiation horizontally or at least partially upwards. The source may be located below the scanning volume.

The crane may further comprise load monitoring means arranged to determine when a load is in the scanning volume and control means arranged to control the scanner in response to signals from the load monitoring means. Optionally, the control means is arranged to determine the position and speed of the load and to control the scanner in response thereto or is arranged to control a pulse frequency of the radiation source dependent on the speed of the load.

The system may further comprise identification means arranged to identify a load and associate scan data from the scanner with a specific load identity. The system may comprise wireless transmission means arranged to transmit scan data from the scanner to a remote station for analysis or transmit scan data from a plurality of cranes to a remote station for analysis.

The present invention further provides a method of scanning a load, comprising moving the load along a path by means of a crane, whilst the load is supported by the crane and the path passes through a scanning volume defined by a scanning system, and scanning the load using the scanning system as it moves along the path.

A system configuration and mode of utilisation may be provided for high throughput screening at large container based facilities with high load throughput. Container ports rely on the use of large cranes for moving containerised cargo from ship to shore and vice versa. An advantage of the present invention is that the cargo can be scanned while in transit, therefore saving time and costs by avoiding the need to take the cargo to a separate scanning location.

BRIEF DESCRIPTION OF THE DRAWINGS

Preferred embodiments of the present invention will now be described by way of example only with reference to the accompanying drawings in which.

DETAILED DESCRIPTION OF THE DRAWINGS

Figure 1:
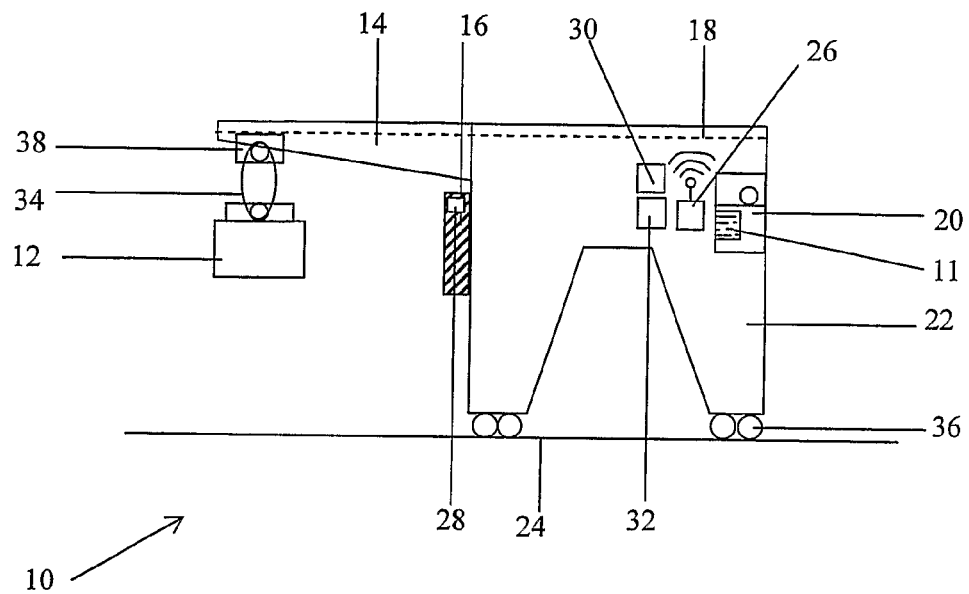
FIG. 1 is a schematic diagram of a crane according to an embodiment of the invention.

Referring to FIG. 1, a crane 10 comprises a main frame 22 supported on wheels 36. A supporting structure 14 projects horizontally from the top of the main frame 22. An operator pod 20 is attached to, or is integral with, the main frame 22 of the crane and includes a control panel 11. A rail 18 extends horizontally along the length of the supporting structure 14 and the frame 22. A carrier 38 is attached to, and moveable along the rail 18. A suspension system 34 is attached to the carrier 38 and may comprise a pulley or winch system. A load 12 can be attached to and suspended by the suspension system 34 by any suitable means as known to a skilled person, such that the load 12 can be moved both vertically and horizontally, along a path which extends along the length of the crane on the rail 18. A scanning system 16 is securely attached to the main frame 22 of the crane 10 and is positioned on the same side of the crane 10 as the supporting structure 14 and below the supporting structure 14. A control system 32, communication system 26 and identification system 30 are mounted on or within the crane 10.

Figure 2:
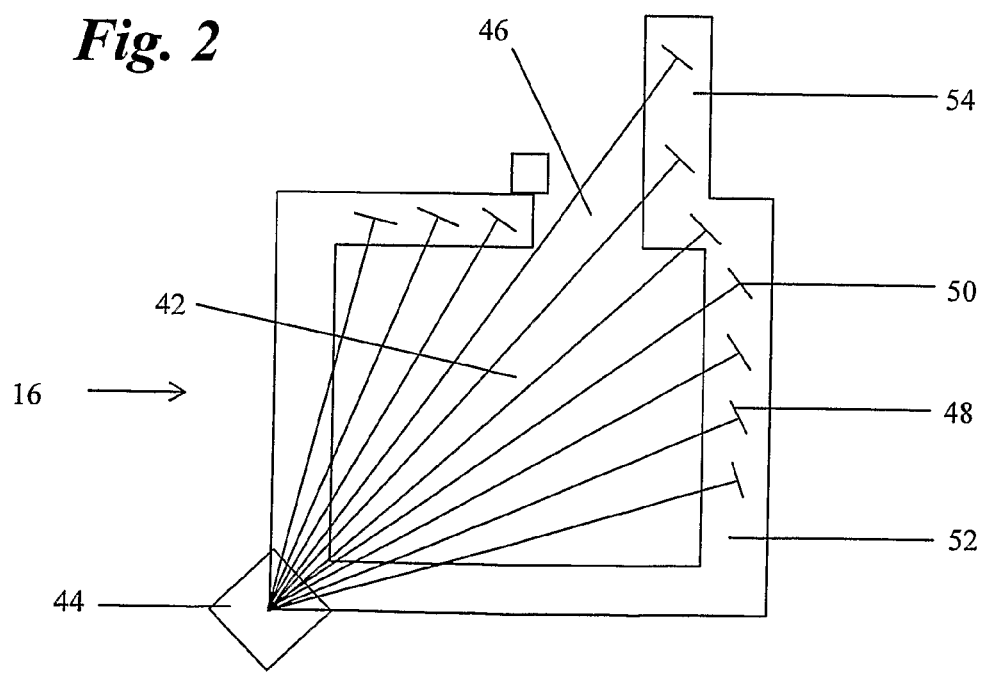
FIG. 2 is a diagram of an imaging system according to an embodiment of the invention.
Figure 3:
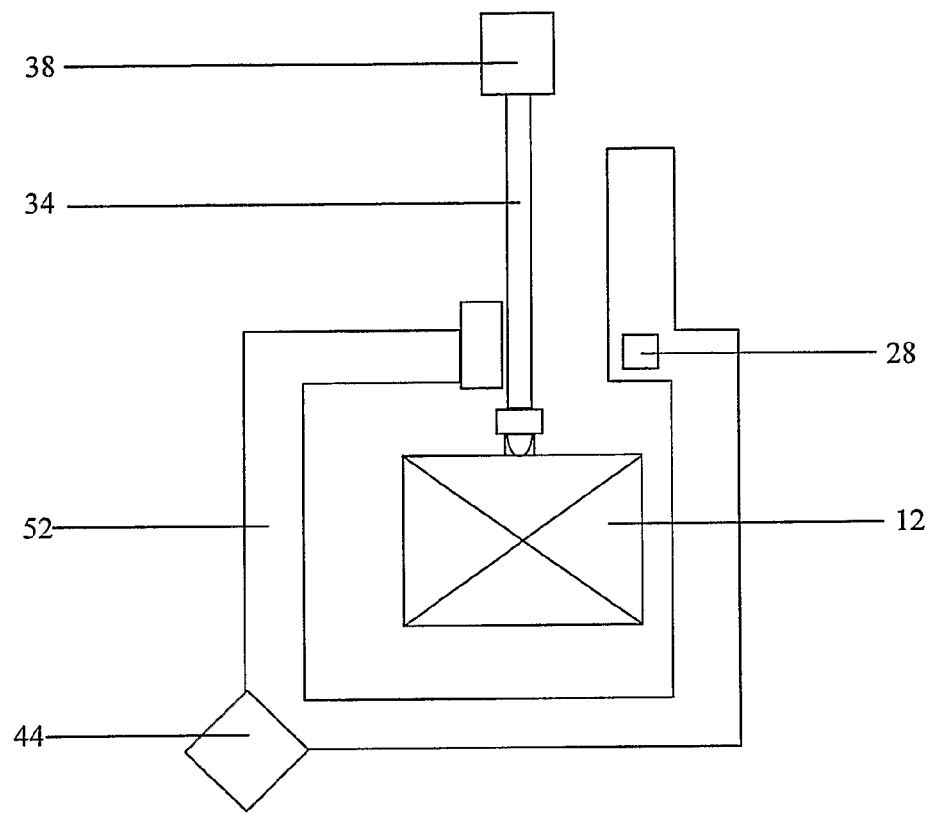
FIG. 3 is a schematic diagram of the imaging system of FIG. 2 including a load according to an embodiment of the invention.

As can be seen from FIGS. 2 and 3, the scanning system 16 comprises a rectangular support frame 52 which extends around an imaging volume 42, defining an aperture through which the load 12 can pass. A gap 46 is defined in the upper side of the support frame 52 through which the suspension system 34 can pass as the load 12 is moved through the scanning volume 42. A part 54 of the support frame 52 extends vertically upwards from the upper side of the support frame adjacent to the gap 46, on the opposite side of the gap 46 to the X-ray source 44, such that the vertical part 54 is positioned approximately diagonally opposite to the X-ray source in the scanning plane of the scanning system 16.

The scanning system 16 includes an X-ray source in the form of a high energy X-ray linear accelerator 44 (typically 6 MV to 9 MV beam quality) mounted at a lower corner of the support frame 52. The X-ray linear accelerator 44 includes radiation shielding such that a fan-beam of X-radiation is directed upwards towards an array of individual X-ray detection elements 48 mounted on the support frame 52. The shielding is inherent to the X-ray LINAC package and comprises bulk shielding around the X-ray accelerator plus a fan-shaped lead collimator which projects the X-ray beam into the object. The detection elements 48 are grouped into short linear segments 50, each in the range typically 100 mm to 200 mm in length. Each of the segments 50 is positioned in a common scanning plane and so that the normal to the centre of each of the linear segments 50 points towards the X-ray source 44. Sufficient sets of segments 50 are positioned within and mounted to the support frame 52 such that X-ray beams that intersect with all parts of the load 12 under inspection will reach a detecting element 48. Detecting segments 50 positioned in the vertical part 54 of the support frame 52 adjacent the gap 46 are arranged to detect radiation from the source 44 that passes through the gap 46.

Because the scanning system 16 is located above ground level and the X-ray beams are directed horizontally or at least partially upwards, little radiation shielding is required to ensure that safe radiation levels are met at ground level. Typically, the crane operator will be a sufficient distance from the X-ray imaging system such that their operating pod 20 need not be shielded.

Figure 4:
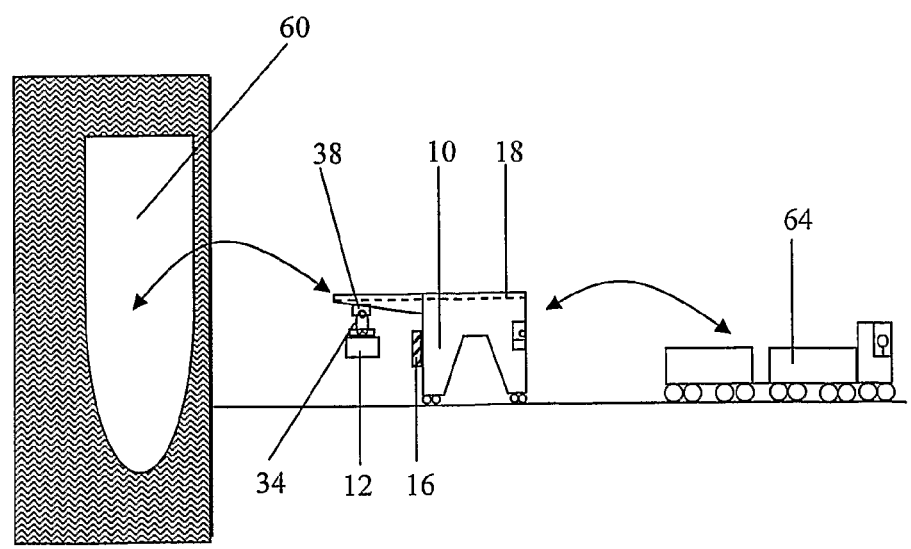
FIG. 4 is a schematic diagram showing the movement of a load between modes of transport.

Referring to FIG. 4, the load 12 will be able to move in three dimensions as it migrates from off-loading site 60 to loading site 64 (or vice versa). The crane 10 can move in two dimensions on the ground. When suspended by the crane 10, the load 12 can be moved vertically by operation of the suspension system 34, and horizontally by movement of the carrier 38 along the rail 18, with respect to the crane 10.

The movement of the crane 10 on the ground is controlled by an operator. The control system 32 receives inputs from the control panel 11 and outputs signals to a drive system of the crane 10 to move the crane 10 along the ground in response. The movement of the carrier 38 and the suspension system 34 is also controlled by an operator. The control system 32 receives inputs from the control panel 11 and operates the movement of the carrier 38 and suspension system 34 in response. The scanning system 16 is operated automatically by the control system 32, as described below. The load 12 can therefore be scanned while being moved along the length of the main frame 22 and supporting structure 14 of the crane 10 and while being moved between the off-loading site 60 and the loading site 64. Typically, the load 12 will be scanned through the scanning volume 42 at a speed of around 0.25 m/s. For a standard 40 foot load, this means an X-ray imaging system scan time on the order of 5 seconds. Attenuation data for each load is collected and stored by the control system 32.

The scanning system 16 further comprises a load monitoring system 28, located within the scanning system 16, which detects the presence of a load 12 entering the scanning volume 42. When a load 12 is detected, a signal is output to the control system 32. The control system 32 processes the signal and automatically activates the X-ray source 44 in response. Similarly, the load monitoring system 28 can detect the absence of the load 12 within the scanning volume 42 (i.e. after a scan of the load 12 is complete) and output a signal to the control system 32 to switch off the X-ray source 44 accordingly. The load monitoring system 28 may include an infrared sensor, a video camera, or any other suitable means known to a person skilled in the art. In an alternative embodiment, the scanning system 16 is manually operated and the control system 32 operates the X-ray source 44 in response to user inputs to the control panel 11.

The load monitoring system 28 monitors the position and speed of the load 12 as it passes through, and just before it passes through, the scanning volume 42. This information is output to the control system 32. The control system 32 controls the pulse repetition frequency of the X-ray linear accelerator 44 in response to the information in order to ensure equal distance between samples in the direction the load 12 is moved along the length of the crane 10. In another embodiment, the control system 32 itself directly monitors the position and speed of the load 12 as it controls its movement along the rail 18 and controls the pulse repetition frequency of the X-ray source 44 in response.

Prior to image interpretation, it is necessary to calibrate the X-ray image data. In this particular imaging system, the distance between each detector segment 50 and the X-ray source 44 varies considerably. This is particularly true for segments 50 located in the vertical part 54 of the support frame 52 adjacent to the gap 46. To achieve a satisfactory calibration, it is necessary to collect some X-ray data prior to the start of imaging and further X-ray data immediately after imaging in order that suitable correction factors can be calculated for image calibration.

In a further aspect of this invention, an identification system 30 identifies each load 12 as it moves through the scanning system 16. The identification system 30 may comprise a camera, video camera, infrared barcode scanner or any other suitable means as known to a person skilled in the art. The load number, barcode or other identity information marked on the load 12 is captured by the identification system 30 as the load 12 passes through the scanning system 16. The identification system 30 outputs the identity information for each load 12 to the control system 32 which labels the X-ray attenuation data with the corresponding identity information for each load 12.

Figure 5:
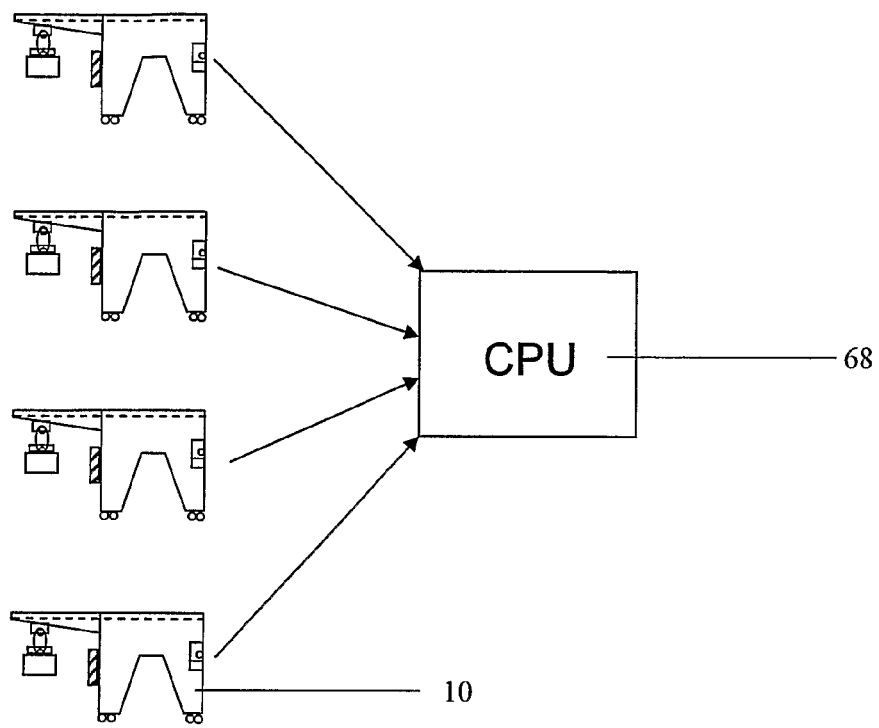
FIG. 5 is a schematic diagram of a data acquisition system according to an embodiment of the invention.

Corresponding image and identification data for each load 12 is collected and stored by the control system 32 in a combined data set for each load 12. Referring to FIG. 5, the control system 32 feeds the combined data set for each load 12 to a wireless communication system 26 which transmits the combined data set for each load 12, for example by using a wireless Ethernet protocol, to a remote inspection station 68 for analysis. This allows data from a multiple crane imaging systems to be interpreted analysed centrally and remotely. An image generated from scan data associated with a particular load is displayed on a monitor for inspection.

I claim:

1. A scanning system for scanning a load suspended from a crane by a suspension system comprising:
   a scanning system support frame defining a partially enclosed scanning volume, wherein the scanning system support frame is attached to a portion of said crane;
   a gap at a top of said scanning system support frame;

an X-ray source angularly positioned at a base of said scanning system support frame; and detectors positioned diagonally opposite said X-ray source, wherein the X-ray source and detectors are adapted to scan the load and generate scan data as the suspension system moves the load through said gap and into said scanning volume.

2. The scanning system of claim 1 wherein said scanning system support frame is attached to a frame of said crane.

3. The scanning system of claim 1 further comprising wheels, wherein the frame of said crane is positioned atop, and supported by, the wheels.

4. The scanning system of claim 1 further comprising at least one radiation detector positioned outside the scanning volume for detecting radiation escaping from the scanning volume.

5. The scanning system of claim 1 wherein the scanning system support frame is rectangular.

6. The scanning system of claim 1 wherein the detectors are positioned within a top portion and a side portion of the scanning system support frame.

7. The scanning system of claim 1 further comprising a support structure projecting horizontally from a top end of a portion of the crane and a rail extending horizontally along a length of the support structure, wherein a portion of the crane is adapted to be movable along said rail.

8. The scanning system of claim 1 further comprising a communication system for wirelessly transmitting the scan data corresponding to each scanned load to a remote station.

9. The scanning system of claim 1 further comprising a load monitoring system for detecting the load entering the scanning volume and transmitting an activation signal.

10. The scanning system of claim 9 further comprising a control system for receiving said activation signal and activating the X-ray source based upon said activation signal.

11. The scanning system of claim 10 wherein the load monitoring system comprises at least one of an infrared sensor and a video camera.

12. The scanning system of claim 1 further comprising a load monitoring system for detecting the load leaving the scanning volume and transmitting a de-activation signal.

13. The scanning system of claim 12 further comprising a control system for receiving said de-activation signal and de-activating the X-ray source based upon said de-activation signal.

14. The scanning system of claim 1 further comprising an identification system, wherein the identification system comprises at least one of a camera, a video camera and a bar code scanner and wherein the identification system is adapted to identify the load by determining one or more of an identification number and a barcode.

15. The scanning system of claim 1 further comprising an identification system adapted to generate identity information, wherein the identification system comprises at least one of a camera, a video camera and a bar code scanner and wherein the identification system is adapted to associate the identity information with the scan data.

16. A method for scanning a load comprising:
vertically suspending the load from a suspension system, wherein the suspension system is attached to a crane;
using the crane and suspension system, horizontally moving the vertically suspended load through a gap positioned at a top of a scanning system support frame, wherein the scanning system support frame defines a partially enclosed scanning volume, wherein an X-ray source is angularly positioned at a base of said scanning system support frame, and wherein detectors are positioned diagonally opposite said X-ray source; and
using the X-ray source and detectors, scanning the load and generating scan data as the suspension system moves the load through said gap.

17. The method of claim 16 further comprising detecting radiation escaping from the scanning volume using at least one radiation detector positioned outside the scanning volume.

18. The method of claim 16 further comprising monitoring whether the load is entering or leaving the scanning volume using a load monitoring system.

19. The method of claim 18 further comprising activating the X-ray source when the load is detected as entering the scanning volume.

20. The method of claim 16 further comprising generating identity information and associating identity information with the scan data using an identification system, wherein the identification system comprises at least one of a camera, a video camera and a bar code scanner.

* * * * *